Oct. 25, 1932.  I. D. PERRY  1,884,831

DOOR BUMPER AND THE LIKE

Original Filed April 2, 1931

Inventor:
Ira D. Perry

Patented Oct. 25, 1932

1,884,831

UNITED STATES PATENT OFFICE

IRA D. PERRY, OF CHICAGO, ILLINOIS, ASSIGNOR TO EDNA L. MEYER, OF ROCKFORD, ILLINOIS

DOOR BUMPER AND THE LIKE

Original application filed April 2, 1931, Serial No. 527,129. Divided and this application filed September 16, 1931. Serial No. 563,058.

This invention has to do with certain new and useful improvements in door bumpers and the like. The door bumper constructions herein disclosed are especially intended for use in connection with the doors of automobile bodies and the like, although it will appear that said features may also be used to advantage in connection with other constructions. Inasmuch, however, as said features have been devised especially with a view to meeting the requirements of automobile doors, I have illustrated and will particularly describe such uses and applications of the invention, but in so doing I wish it clearly understood that I do not thereby intend to limit myself except as I may do so in the claims.

In the construction of automobile bodies it is customary to provide a door frame member or element against or toward which the edge portion of the door moves during the door closing operation. Usually this element is in the form of what is known as a door pillar. The door pillar is generally so formed as to provide a ledge facing in the direction of door closing movement and also to provide inwardly extending flanges lying parallel to the direction of door closing movement. Generally said pillar is also provided with an outwardly extending flange which also lies parallel to the direction of door closing movement.

The companion edge portion of the door is so formed as to provide companion ledges and flange surfaces; the ledge of the door approaching directly towards the ledge of the door pillar, and the flanges of the door moving parallel to or wiping close to the flanges of the door pillar.

It is usually customary to provide one or more bumper blocks on the door pillar in position to receive the forces of pressure and impact incident to the door closing operation. Generally these bumper blocks on the door pillar are provided with head portions which are supported by the door pillar or some element thereon and the ledge of the door strikes or presses against the head portion of the bumper block when the door is closed. The bumper block is also usually provided with a lip or skirt portion which overlies the inwardly extending flange at the position of the bumper block and establishes a wiping contact surface against which the companion flange surface of the door wipes during the door closing movement.

The main object of the present invention is to provide a bumper block and a support therefor on the ledge of the door pillar, the arrangement being such that the body portion of the bumper block is directly supported by a depression of the ledge of the door pillar so that the forces of pressure and impact are taken by said depressed portion of the ledge; the ledge of the door pillar being provided with endwise facing openings at the position of said depression so as to receive the endwise projecting lugs of the body portion of the bumper block.

Other objects and uses of the invention will appear from a detailed description of the same which consists in the features of construction and combinations of parts hereinafter described and claimed.

In the drawing:

Figure 1 may be considered as a section on the lines 1—1 of Figures 2 and 3 looking in the direction of the arrows;

This application is a division of my copending application Serial No. 527,129, filed April 2, 1931.

In the construction illustrated the door pillar 10 is provided with the ledge 11 which faces in the direction of door closing movement; and the door pillar is also provided with the inwardly and outwardly extending flanges 12 and 13 respectively which lie parallel to the direction of door closing movement.

Figure 1:
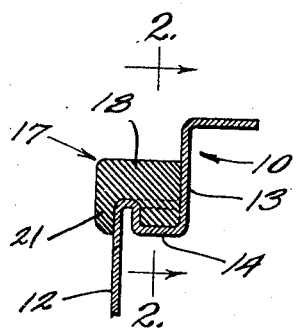
Figure 1 shows a fragmentary cross section through a portion of the door pillar at the position of said depressed bumper block seat, the bumper block being in place in said seat.
Figure 2:
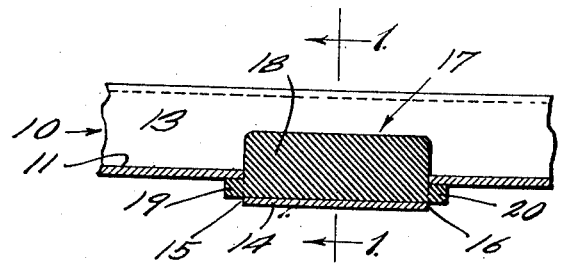
Figure 2 shows a longitudinal section on the line 2—2 of Figure 1 looking in the direction of the arrows.
Figure 3:
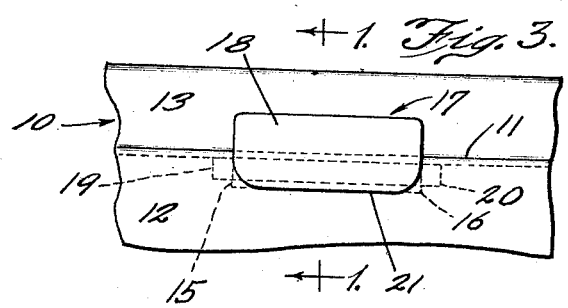
Figure 3 shows a fragmentary face view of a short section of door pillar having applied thereto a bumper block embodying the features of the present invention.

At the position of the bumper block the ledge 11 and adjacent portions of the flange 13 are so treated as to provide a depressed longitudinally extending bumper block socket or seat 14 which is retained by the metal of the drawn portion of the flange 13 as well as the connection to the untreated portion of the ledge. This seat 14 is also open at both ends so as to establish the end openings 15 and 16 as best shown in Figure 2.

The bumper block 17 includes the head portion 18 which rests upon and is directly supported by the seat 14, said head portion being of substantially the full length of the seat. The head portion 18 is also provided with the endwise projecting lugs 19 and 20 which extend beyond the seat and through the openings 15 and 16 respectively, said lugs being located beneath the surface of the ledge 11 as clearly shown in Figure 2. In this manner the bumper block is securely retained in place on the ledge without the use of any extraneous connecting devices.

In the particular construction illustrated the bumper block is also provided with a short lip or skirt 21 which overlies the edge portion of the flange 12 at the position of the bumper block.

It will be understood that the bumper block is made of rubber or other elastic material so that it is readily bent or deflected in order to set it into place on the door pillar.

While I have herein shown and described only a single embodiment of the features of my present invention, still I do not intend to limit myself thereto except as I may do so in the claims.

I claim:

1. A door buffer device comprising a sheet metal pillar member formed to provide an impact ledge facing in the direction of door closing movement, and oppositely extending side flanges disposed substantially parallel to the direction of door closing movement and connected to the edges of said ledge, the sheet metal being suitably formed to provide a socket alongside the outwardly extending flange and reaching along the ledge part way to the inwardly extending flange, said socket having a bottom wall and front and rear walls integral therewith, the front wall being an integral continuation of the ledge and the rear wall an integral continuation of the outwardly extending flange, the ends of the socket being open and communicating directly beneath the ledge, and a bumper block of resilient material fitting in and projecting from said socket and seated on the bottom thereof in engagement with the front and back walls, said bumper block having lugs reaching endwise through the open ends of the socket and engaging under the ledge to retain the block in the socket.

2. A door buffer device as set forth in claim 1 wherein that portion of the bumper block projecting from the socket is formed so as to overlie that portion of the ledge between the socket and the inwardly extending flange, the bumper block having a lip projecting therefrom and arranged to overlie the side of the inwardly extending flange.

3. A door buffer device comprising a sheet metal pillar member formed to provide an impact ledge facing in the direction of door closing movement and an inwardly extending side flange disposed substantially parallel to the door closing movement and connected to the edge of said ledge, the sheet metal being suitably formed to provide a socket in said ledge spaced from the inwardly extending flange, said socket having a bottom wall and front and back walls integral therewith and with the rest of the pillar, the ends of the socket being open and communicating directly beneath the ledge, and a bumper block of resilient material fitting in and projecting from the socket and seated on the bottom wall thereof, said block having lugs thereon reaching endwise through the open ends of the socket and engaging under the ledge to retain the bumper block in the socket.

4. A door buffer device as set forth in claim 3 wherein that portion of the bumper block projecting from the socket is formed so as to overlie that portion of the ledge between the socket and the inwardly extending flange, the bumper block having a lip projecting therefrom and arranged to overlie the side of the inwardly extending flange.

5. A door buffer device comprising a sheet metal pillar member formed to provide an impact ledge facing in the direction of door closing movement, and a side flange connected to the edge of said ledge, the sheet metal being suitably formed to provide a socket extending inwardly from the ledge proper, the socket having a bottom wall and a side wall integral with one another and with the ledge, the ends of the socket being open and communicating directly beneath the ledge, and a bumper block of resilient material fitting in and projecting from the socket and seated on the bottom wall thereof, said block having lugs thereon reaching endwise through the open ends of the socket and engaging beneath the ledge to retain the block in the socket.

6. A door buffer device as set forth in claim 5 wherein the projecting portion of the block is formed to extend transversely with relation to the socket to overlie the ledge alongside the socket.

7. A door buffer device comprising a sheet metal pillar member formed to provide an impact ledge facing in the direction of door closing movement, and a side flange connected to the edge of said ledge, the sheet metal being suitably formed to provide a socket in the ledge proper, said socket having a bottom wall and a side wall integral with each other, the side wall being an integral continuation of the side flange, the ends of the socket being open and communicating directly beneath the ledge, and a bumper block of resilient material fitting in and projecting from the socket and seated on the bottom wall thereof, said block having lugs reaching endwise through the open ends of the socket and engaging under the ledge to retain the block in the socket.

8. A door buffer device as set forth in claim 7 wherein the projecting portion of the block is formed to extend transversely with relation to the socket to overlie the ledge alongside the socket.

IRA D. PERRY.